Aug. 10, 1943. N. J. BOEHM ET AL 2,326,325
SPREADER LEG AND DRAG
Filed May 29, 1941 2 Sheets-Sheet 2

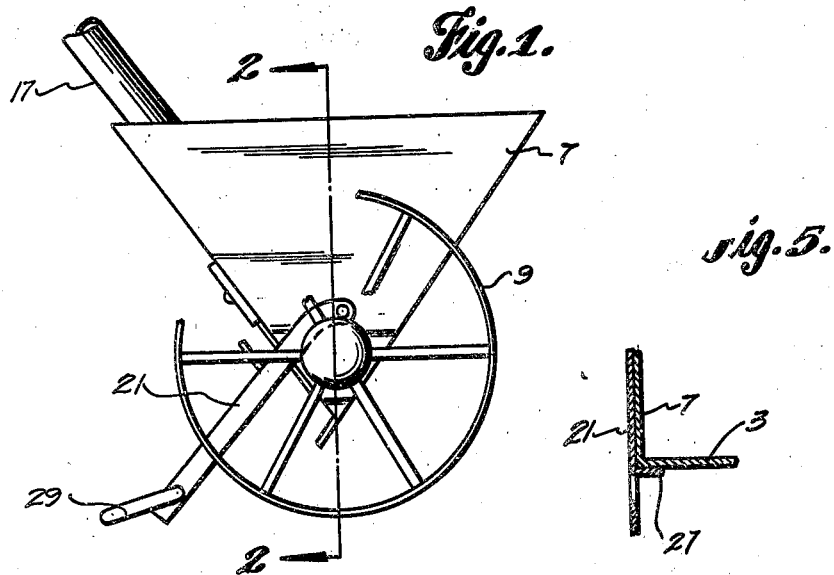
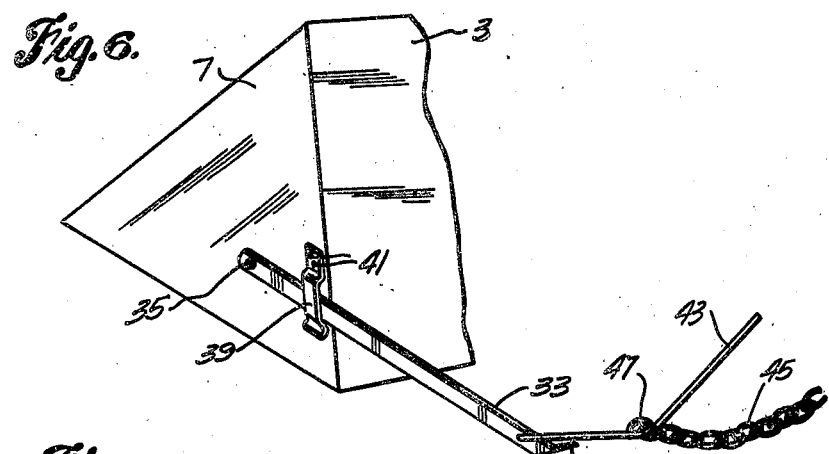
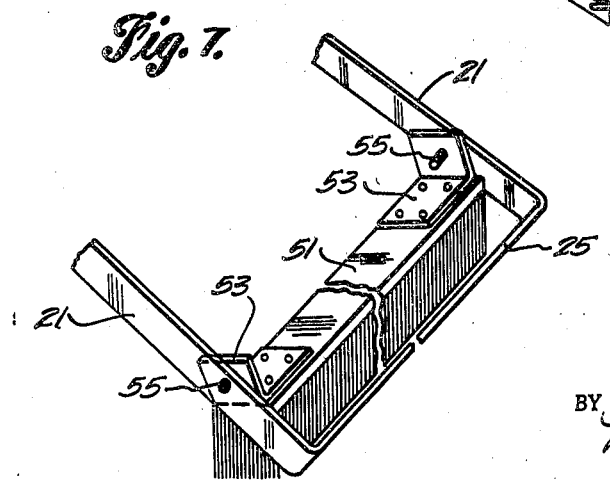

INVENTORS.
NORMAN J. BOEHM.
DAVID E. STAUB.
BY Ralph L. Binninger
ATTY.

Patented Aug. 10, 1943

2,326,325

UNITED STATES PATENT OFFICE 2,326,325

SPREADER LEG AND DRAG

Norman J. Boehm, Detroit, and David E. Staub, Grosse Pointe Park, Mich., assignors to Allied Manufacturers, Inc., Detroit, Mich.

Application May 29, 1941, Serial No. 395,718

6 Claims. (Cl. 275—2)

Our invention pertains to distributors for scattering fertilizer and other loose fluent materials on the earth, as for preparing a seed bed for example.

It is an object of our invention to provide a spreader of an improved simplified construction which is more convenient to use for more effectively distributing and spreading fertilizer and other materials on the soil.

It is also an object of our invention to provide a distributor having associated means serving the combined purpose of a support leg and a spreader or drag, for supporting the distributor when it is not in operation and for scattering, leveling or spreading the loose material when the distributor is in operation.

Further objects and advantages are within the scope of our invention, such as relate to the arrangement, operation and function of the related elements of the structure, to various details of construction and to combinations of parts, elements per se, and to economies of manufacture and numerous other features as will be apparent from a consideration of the specification in conjunction with the drawings disclosing specific embodiments of my invention, similar reference characters being applied to corresponding elements throughout, and in which:

Fig. 1 is a side elevational view of a distributor having a combined support and spreader leg or drag in accordance with our invention;

Fig. 5 is an enlarged fragmentary sectional view showing the stop blanked out of the leg for engaging the hopper;

Fig. 6 is an enlarged fragmentary perspective view showing another embodiment of the combined support leg and spreader attached to the distributor hopper; and Fig. 7 is an enlarged fragmentary view illustrating still another embodiment of the support leg and spreader.

Figure 2:
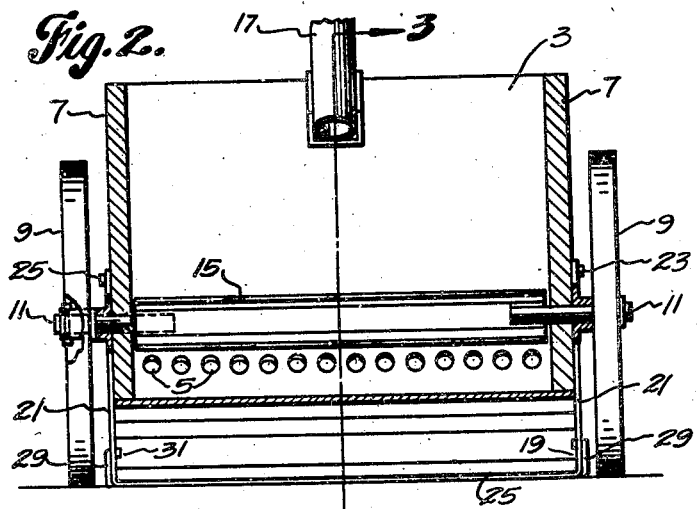
Fig. 2 is a sectional view taken on line 2—2 of Fig. 1.
Figure 3:
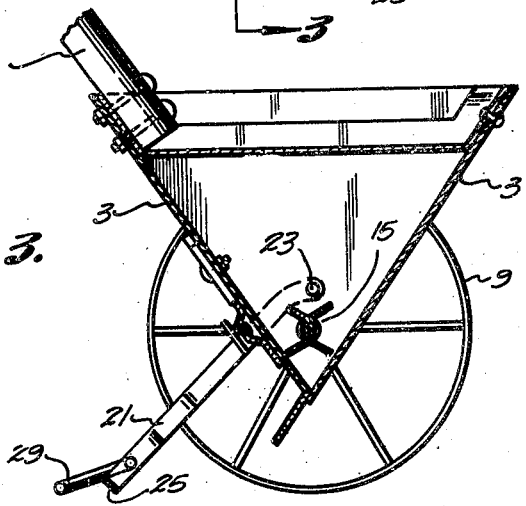
Fig. 3 is a cross-sectional view taken on line 3—3 of Fig. 2.
Figure 4:
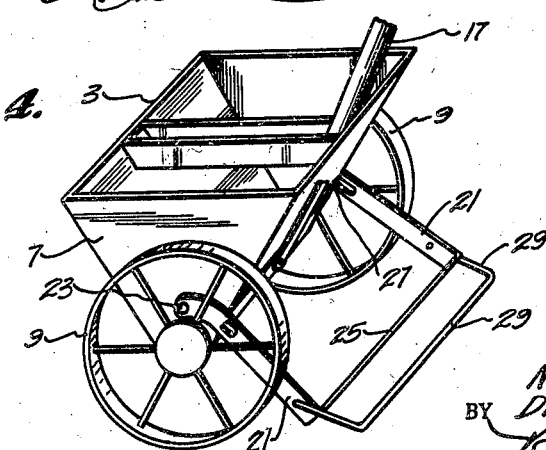
Fig. 4 is a perspective view of the distributor.

Referring more specifically to Figs. 1, 2, 3 and 4, it will be seen that such a distributor comprises essentially a hopper having two side walls 3 arranged in a generally V-shape, open at the top and having a series of openings 5 provided near the bottom of the hopper in one side wall thereof, which is the rear wall. The distributor hopper, which comprises end walls 7, is supported on and carried on two wheels 9 having stub axles 11 secured in and extending from the hubs through suitable bearing plates 13 on the end walls, into the hopper. The inner ends of the axles 11 are secured to the ends of an agitator 15 extending therebetween in the lower portion of the hopper.

As the distributor is pushed along by a handle 17 projecting from the rear wall of the hopper, the agitator is rotated and the loose material in the hopper is slowly and uniformly sifted through the openings 5 onto the ground. The details of the construction of such distributors, and the mode of operation thereof, is well known in the prior art. Patent Nos. 1,957,594 and 1,976,725 disclose prior constructions whereon our present invention may be advantageously utilized and there are also other distributors which may be improved by the addition of our present invention.

In accordance with our invention, we provide a combined supporting leg and spreading drag which is a substantially U-shaped member 19 made of strap iron of a suitable cross-section to provide the necessary strength and rigidity. The U-shaped spreader 19 is made of a suitable size to have the ends of the side legs 21 disposed adjacent and pivotally secured to the opposite ends of the hopper, as by pivot pins 23 extending therethrough. The side legs 21 of the U-shaped member are of a suitable length so that the yoke 25 rests upon the ground to serve as a support when the distributor is stationary and to serve as a drag for moving the grass or other distributed material when the distributor is in motion. The side legs 21 of the U-shaped spreader support are provided with inwardly projecting stops 27 suitably disposed to engage the back wall of the hopper for supporting the hopper which tends to tip backwardly and spill the contents as soon as the operator ceases to hold the handle. As shown, the stops 27 may be formed by being blanked or struck out from the strip of metal forming the U-shaped member, although any such stop projections may be provided in any suitable manner. When the operator grasps the handle 17 and pushes the distributor, the hopper is tilted forwardly away from the inwardly directed stops 27 so that the U-shaped drag member is released to move freely over the contour of the ground for leveling the soil and uniformly spreading the fertilizer or other loose material.

In order to augment the effectiveness of the U-shaped member as a spreader, an auxiliary U-shaped spreader 29 is also preferably provided and secured pivotally thereto so that it does not interfere with the supporting function thereof. For this purpose the auxiliary spreader 29 is preferably formed of a round rod bent to a U-shape with inwardly bent terminals 31 passing inwardly through holes in the side legs 21 of the support member. The auxiliary spreader 29 is easily installed or removed by springing the inwardly bent terminals 31 into or out from the holes in the side legs 21.

In operation the operator grasps the handle 17 and pushes the distributor along over the ground. This operation causes the hopper to be tilted slightly forward and away from the inwardly extending stops 27 so that the yoke 25 of the main drag member is then free to follow the contour of the soil for uniformly spreading and scattering the fertilizer or other material and it may also serve to level the soil. The auxiliary drag element 29 draws lightly over the soil at the rear of the main drag and serves to more perfectly scatter, level or spread the soil and fertilizer together. When the operator has completed the task, he merely releases the handle and the hopper of the distributor then tilts backwardly against the legs which serve as a support so the hopper cannot tip over backward.

Fig. 6 shows a different embodiment comprising two separately disposed support legs 33, one end of each being pivotally attached to the end wall 7 of the hopper, as by pivot pins 35. The legs 33 are made of strips of metal, such as strap iron, and the lower end of each leg is provided with a bent portion forming a foot 37 adapted to rest upon the ground for supporting the hopper when the distributor is stationary. In this position, the upward movement of each supporting leg 33 is limited by a stop clasp 39 secured on each end wall of the hopper, as by rivets 41.

A drag rod 43 is provided which is pivotally interconnected between the lower ends of the legs 33. The drag rod 43 is preferably a slender rod which is rather flexible so that it will follow the contour of the soil. To augment the function of the drag rod a chain 45 is also preferably stretched to drag behind the rod by having the ends looped into loops 47 formed in the rod 43. The operation of this embodiment is similar to that previously described.

In Fig. 7 is shown another embodiment of our combined support leg and drag comprising a U-shaped member 21 of strap iron which is shaped and cooperatively connected to the distributor in the same manner as previously described with reference to the first embodiment of our invention. In accordance with this embodiment of our invention, the auxiliary drag consists of a large brush 51 which is pivotally suspended between the legs 21, in any suitable manner, as by angle-bearing lugs 53 which are pivotally supported on pivot pins 55 projecting from the legs. The brush 51 is so supported that it sweeps along over the surface of the soil, leveling and scattering any large bunches or piles of fertilizer which have been dropped from the hopper. The cross-bar or yoke of the U-shaped member then drags over the soil with greater weight or pressure to more thoroughly level or scatter and disperse the loose material with the soil. The legs 21 of the drag also serve to support the hopper from tilting back and spilling when the distributor is not in operation, as previously described.

It is apparent that within the scope of the invention, modifications and different arrangements may be made other than herein disclosed, and the present disclosure is illustrative merely, the invention comprehending the variations thereof.

We claim:

1. A distributor having in combination, a hopper for carrying a fluent material to be distributed upon the ground, wheels carrying said hopper, a combination drag and support member, stop means projecting from said member for engaging said hopper and means pivotally attaching said member to said hopper to drag behind when the distributor is operating and to rest on the ground and support the hopper when the distributor is not in operation.

2. A distributor having in combination, a hopper for carrying a fluent material to be distributed upon the ground, wheels carrying said hopper, a U-shaped member comprising legs adapted to be disposed adjacent the opposite ends of the hopper and a yoke adapted to drag on the ground behind the distributor, stops projecting inwardly from said legs, and means pivotally attaching the ends of said legs to the ends of the hopper to provide a drag when operating and a support when stationary.

3. A distributor having in combination, a hopper for carrying a fluent material to be distributed upon the ground, wheels carrying said hopper, a U-shaped member comprising legs adapted to be disposed adjacent the opposite ends of the hopper and a yoke adapted to drag on the ground behind the distributor, stops projecting inwardly from said legs, a second U-shaped member being pivotally secured in the legs of the first member for dragging the yoke of the second member behind the yoke of the first U-shaped member, and means pivotally attaching the ends of said legs to the ends of the hopper to provide a drag when operating and a support when stationary.

4. A distributor having in combination, a hopper for carrying a fluent material to be distributed upon the ground, wheels carrying said hopper, a U-shaped member comprising legs adapted to be disposed adjacent the opposite ends of the hopper and a yoke adapted to drag on the ground behind the distributor, a brush of a suitable length to extend between said legs, means for pivotally supporting said brush therebetween to brush the ground in front of the yoke of the U-shaped member, and means pivotally attaching the ends of said legs to the ends of the hopper to provide a drag when operating and means adapted to cooperate with said legs in forming a support for said hopper when stationary.

5. A distributor having in combination, a hopper for carrying loose material to be distributed upon the ground, wheels for carrying the hopper, two separate support legs, means for pivotally mounting one end of each leg to a different end of said hopper, a clamping device on the hopper for securing each leg so that the extended ends of said legs rest upon the ground to support the hopper from tilting when not in use, and means connected between the extended ends of said legs for dragging upon the ground to spread and distribute the material when the distributor is in operation.

6. A distributor having in combination, a hopper for carrying loose material to be distributed upon the ground, wheels for carrying the hopper, two separate support legs, means for pivotally mounting one end of each leg to a different end of said hopper, stop means on the hopper adapted to secure the legs against movement when the distributor is not in operation, so that the extended ends of said legs then rest upon the ground to support the hopper from tilting, and a rod connected between the extended ends of said legs for dragging upon the ground to spread and distribute the material when the distributor is in operation and a chain secured at the ends to spaced portions of said rod for dragging over the soil.

NORMAN J. BOEHM.
DAVID E. STAUB.